C. AND E. J. TOEPFER.
HEADLIGHT SHIELD.
APPLICATION FILED JUNE 15, 1920.
1,388,221.
Patented Aug. 23, 1921.
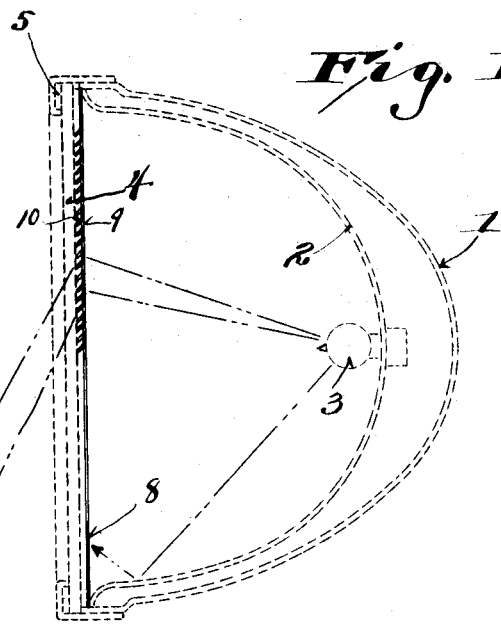
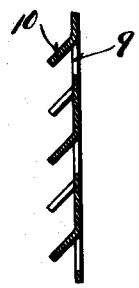
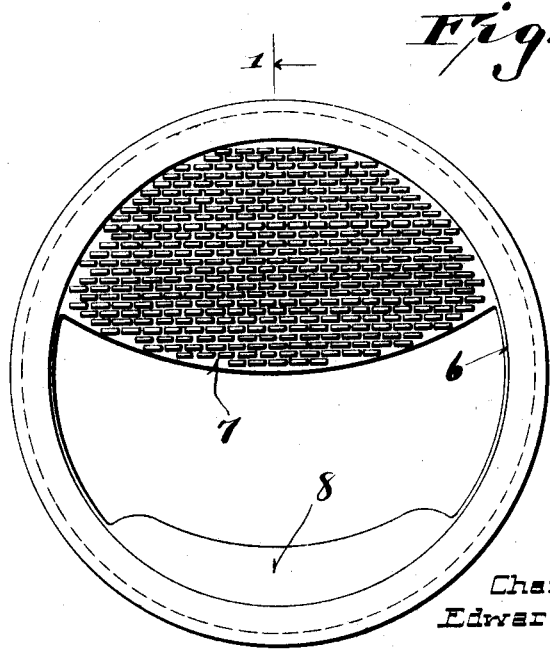
Inventors:
Charles Toepfer
Edward J. Toepfer
Witness
Robert Weber
By Young & Young,
Attorneys.

UNITED STATES PATENT OFFICE.

CHARLES TOEPFER AND EDWARD J. TOEPFER, OF MILWAUKEE, WISCONSIN.

HEADLIGHT-SHIELD.

1,388,221.   Specification of Letters Patent.   Patented Aug. 23, 1921.

Application filed June 15, 1920. Serial No. 389,093.

*To all whom it may concern:*

Be it known that we, CHARLES TOEPFER and EDWARD J. TOEPFER, both citizens of the United States, and residents of Milwaukee, in the county of Milwaukee and State of Wisconsin, have invented certain new and useful Improvements in Headlight-Shields; and we do hereby declare that the following is a full, clear, and exact description thereof.

Our invention relates to new and useful improvements in shields for retarding the rays of light which are thrown from the reflector of an automobile or other vehicle headlight.

At the present time there is considerable inventing being carried on with the idea of evolving an automobile headlight covering which will effectively break up and direct the rays of light so that the drivers of approaching automobiles, and other vehicles and pedestrians will not be blinded by the glare as is at present the case. We have devised a very simply constructed shield which can be easily applied to any headlight at present in use and will not only effectively break up and in a small manner retard the rays of light, but will direct such rays downwardly toward the ground. The possibility of persons approaching a light provided with such a shield being blinded is obviated.

An additional object of the invention is to provide a shield of this character which will interfere with the rays of light which are usually reflected upwardly from the lower portion of the headlight reflector as well as the stronger and more blinding rays which are thrown from the upper portion of the reflector and the part thereof surrounding the electric light bulb.

A still further object of the invention is to provide a headlight shield which can be formed of sheet material, such as light gage sheet metal, having a plurality of light openings formed therein and each provided with an independent deflector.

With these and other objects in view the invention resides in the novel features of construction, combination and arrangement of parts which will be hereinafter more particularly described and claimed.

In the accompanying drawing:

Figure 1 represents a vertical transverse sectional view such as will be taken on the plane of the line 1—1 of Fig. 2, and showing the relation of our invention to the ordinary parts of a vehicle headlight.

Fig. 2 is a front elevational view of a headlight casing having our invention applied, and Fig. 3 is an enlarged detail section through the upper portion of the shield shown in Figs. 1 and 2.

Referring more particularly to the drawing, the reference character 1 denotes a headlight casing of the usual cup shape, or any other common design, having therein a somewhat similarly shaped reflecting mirror 2, in the center of which is an electric lamp bulb 3. The customary transparent glass 4 is secured over the outer or open end of the casing 1 by a retaining band 5. In its preferred application to the casing, a shield constructed in accordance with our invention is clamped between the open end of the casing and the reflector and the glass plate 4 as indicated in Fig. 1. However, any other preferred attaching means, or means of assembling this shield may be employed.

This shield in its preferred embodiment consists of an annular strip 6 of sheet material of sufficient diameter to be held within the open end of the casing 1, an approximately semi-circular plate 7 adapted to cover the upper half of the casing, and an arcuate plate 8 covering a small portion of the bottom or lower portion of the opening of the casing. Thus, as shown in Fig. 1, the rays of light normally thrown from the upper portion of the reflector are retarded and the rays from the lower portion of said reflector are deflected by the plate 8. In practice the strip of metal 6 and the two plates 7 and 8 are stamped from a single sheet of material, the same having a substantially arcuate opening defined by the adjacent edges of the plates 7 and 8 and the inner edges of the intermediate parts of the annular strip 6.

The larger upper plate 7 has a plurality of light openings 9 which are arranged in approximately horizontal rows and the openings of one row are staggered with respect to the openings of the next adjacent rows. In forming the openings 9, the plate 7 is punched through from its inner to its outer surface, and the material struck from said openings is disposed as shown in Fig. 3. In other words, such material forms a downwardly inclined individual deflector 10 for each of said openings. Like the openings these deflectors are arranged in horizontal rows and staggered with respect to each other. As a result of this construction the light rays from the reflector 2 are thrown downwardly by the deflectors 10. Thus all of the rays of light which normally tend to blind persons approaching the headlights are directed downwardly or are deflected as by the plate 8 without materially interfering with or reducing the effectiveness of the headlight.

We claim:

1. A shield for a headlight or the like, comprising a substantially semi-circular opaque plate having a plurality of relatively small elongated light openings therein, formed by punching the material of the plate through from one side, the material struck from the openings forming independent deflector plates extending downwardly and forwardly from the upper sides of the openings, the openings of one row being staggered with respect to the openings of the next adjacent rows.

2. A shield for a headlight or the like, comprising a substantially semi-circular light retarding plate adapted to cover the upper portion of a headlight, said plate having a plurality of vertically spaced rows of longitudinally elongated light openings therein, formed by punching the material of the plate through from one side, the material struck from the openings forming independent deflector plates extending downwardly and forwardly from the upper sides of the openings, the openings of one row being staggered with respect to the openings of the next adjacent rows, narrow strips extending from the plate and disposed at the sides of the casing, and a relatively narrow imperforate deflector plate positioned at the bottom casing and connected at its ends with said strips.

In testimony that we claim the foregoing we have hereunto set our hands at Milwaukee, in the county of Milwaukee and State of Wisconsin.

CHARLES TOEPFER.
EDWARD J. TOEPFER.